US012663365B2

(12) United States Patent
Moeller-Willenberg et al.

(10) Patent No.: US 12,663,365 B2
(45) Date of Patent: Jun. 23, 2026

(54) COLOR-MONITORING ASSEMBLY FOR A ROASTING MATERIAL, ROASTER ASSEMBLY AND METHOD FOR ROASTING THE ROASTING MATERIAL

(71) Applicant: PROBAT SE, Emmerich (DE)

(72) Inventors: Uwe Moeller-Willenberg, Kleve (DE); Thomas Koziorowski, Muelheim an der Ruhr (DE)

(73) Assignee: PROBAT SE, Emmerich (DE)

( * ) Notice: Subject to any disclaimer, the term of this patent is extended or adjusted under 35 U.S.C. 154(b) by 202 days.

(21) Appl. No.: 18/567,368

(22) PCT Filed: Jun. 8, 2022

(86) PCT No.: PCT/EP2022/065489
§ 371 (c)(1),
(2) Date: Dec. 6, 2023

(87) PCT Pub. No.: WO2022/258661
PCT Pub. Date: Dec. 15, 2022

(65) Prior Publication Data
US 2024/0272067 A1 Aug. 15, 2024

(30) Foreign Application Priority Data
Jun. 9, 2021 (DE) ..................... 10 2021 114 895.2

(51) Int. Cl.
*G01N 21/25* (2006.01)
*A23N 12/12* (2006.01)
(Continued)

(52) U.S. Cl.
CPC ......... *G01N 21/251* (2013.01); *A23N 12/125* (2013.01); *G01N 21/255* (2013.01);
(Continued)

(58) Field of Classification Search
CPC .... G01N 21/251; G01N 21/255; G01N 21/85; G01N 2021/8466; G01N 2021/8592; G01N 2201/08; A23N 12/125
See application file for complete search history.

(56) References Cited

U.S. PATENT DOCUMENTS

| | | | |
|---|---|---|---|
| 3,970,394 | A | 7/1976 | Stanton |
| 4,849,625 | A | 7/1989 | Camerini Porzi |

(Continued)

FOREIGN PATENT DOCUMENTS

| | | | | |
|---|---|---|---|---|
| CH | 690864 A5 * | 2/2001 | ............. | G01J 3/502 |
| DE | 37 20 388 A1 | 12/1988 | | |

(Continued)

*Primary Examiner* — Thanh Luu
*Assistant Examiner* — Mai Thi Ngoc Tran
(74) *Attorney, Agent, or Firm* — Norman B. Thot

(57) ABSTRACT

A color monitoring arrangement includes a light sender, a light guide arrangement with a light guide which forwards a light beam emitted by the light sender to illuminate a product, and a light guide which forwards light reflected by the product to a light receiver, an optical device which applies the light beam to the product and the reflected light into the light guide arrangement, an evaluation unit which defines a color value for the product, and a measuring probe with first opening and a second opening opposite thereto. The color value is based on a quotient of reflection measurements of a light intensity of the light beam to a light intensity of the reflected light for two light wavelengths. The light guide arrangement is guided into the first opening into the measuring probe, and the optical device is arranged at the second opening of the measuring probe.

18 Claims, 3 Drawing Sheets

(51) Int. Cl.
    *G01N 21/84*       (2006.01)
    *G01N 21/85*       (2006.01)

(52) U.S. Cl.
    CPC ..... *G01N 2021/8466* (2013.01); *G01N 21/85*
        (2013.01); *G01N 2021/8592* (2013.01); *G01N*
                               *2201/08* (2013.01)

(56)                References Cited

U.S. PATENT DOCUMENTS

| | | | |
|---|---|---|---|
| 9,554,738 B1 | 1/2017 | Gulati et al. | |
| 2009/0310124 A1* | 12/2009 | Thomson ........... | G01N 21/8507 |
| | | | 356/51 |
| 2015/0314952 A1 | 11/2015 | Empl et al. | |
| 2016/0097711 A1* | 4/2016 | Wang ..................... | G01N 21/27 |
| | | | 250/206 |
| 2020/0064196 A1 | 2/2020 | Inada | |
| 2020/0300709 A1* | 9/2020 | Schmid ................. | G01J 9/0246 |
| 2020/0354142 A1* | 11/2020 | Malkin ................. | F16J 15/021 |

FOREIGN PATENT DOCUMENTS

| | | | | |
|---|---|---|---|---|
| DE | 196 45 306 A1 | 11/1997 | | |
| JP | 04-311349 A | 11/1992 | | |
| JP | H04311349 A | * 11/1992 | .............. | A23F 5/04 |
| JP | 2001-141563 A | 5/2001 | | |
| JP | 2013-66599 A | 4/2013 | | |
| JP | JT 2013-66599 A | 4/2013 | | |
| JP | 2016-505296 A | 2/2016 | | |
| JP | 2017-53858 A | 3/2017 | | |
| JP | 2020-30754 A | 2/2020 | | |
| JP | 2020-102807 A | 7/2020 | | |

* cited by examiner

COLOR-MONITORING ASSEMBLY FOR A ROASTING MATERIAL, ROASTER ASSEMBLY AND METHOD FOR ROASTING THE ROASTING MATERIAL

CROSS REFERENCE TO PRIOR APPLICATIONS

This application is a U.S. National Phase application under 35 U.S.C. § 371 of International Application No. PCT/EP2022/065489, filed on Jun. 8, 2022 and which claims benefit to German Patent Application No. 10 2021 114 895.2, filed on Jun. 9, 2021. The International Application was published in German on Dec. 15, 2022 as WO 2022/258661 A1 under PCT Article 21(2).

FIELD

The present invention is directed to a color monitoring assembly for a roasting product, the color monitoring assembly comprising a light sender with at least one light source for illuminating the roasting product, optical means for applying a reflected light beam to a light guide arrangement, and an evaluation unit, wherein the light guide arrangement is connected by control technology to the evaluation unit for defining at least one color value for the roasting product, which can be determined by quotient formation for at least two light wavelengths $\lambda_1$, $\lambda_2$ of the respective reflection measurement, the light intensity of the incident light to the light intensity of the reflected light. The present invention is also directed to a roasting arrangement and to a method for roasting the roasting product.

BACKGROUND

A generic color monitoring arrangement for roasting products, such as any vegetable loose material, such as coffee beans, cereals, cocoa, etc., is described in DE 37 20 388 A1. DE 37 20 388 A1 describes an arrangement and a method in which the control variables, roasting temperature, and roasting time, are to be checked or adjusted on the basis of a determined color value of the roasting product. For this purpose, a difference is calculated between a light intensity $L_1$ of an incident light and the corresponding light intensity $L_2$ of the reflected light (reflection measurement) for at least two light wavelengths $\lambda_1$, $\lambda_2$. The quotient formation of the two reflection measurements of the respective wavelengths eliminates errors that can occur during the measurement of the reflecting light beam due to the special basic conditions. Such an arrangement or such a method for monitoring the color of moving roasting products has, however, not been able to become established in the market because the color monitoring arrangement was too complex in structure and because the light feed into the roasting container as well as into the light guide is too error-prone and inaccurate, for example, due to a hot and dusty atmosphere in the roasting container.

SUMMARY

An aspect of the present invention is therefore to avoid the above-mentioned disadvantages in a simple and cost-effective manner.

In an embodiment, the present invention provides a color monitoring arrangement for a roasting product. The color monitoring arrangement includes a light sender comprising at least one light source, a light receiver, a light guide arrangement comprising a first light guide which is configured to forward the light beam, and a second light guide which is configured to forward a reflected light reflected by the roasting product to the light receiver, an optical device which is configured to apply the light beam to the roasting product and to apply the reflected light into the light guide arrangement, an evaluation unit which is controllably connected to the light guide arrangement for defining at least one color value for the roasting product, and a measuring probe comprising a first opening at a first end and a second opening at a second end, the first end being opposite to the second end. The light sender is configured to emit a light beam provided by one of the at least one light source to illuminate the roasting product. The at least one color value is determined by taking a quotient of reflection measurements of a light intensity of the light beam to a light intensity of the reflected light for at least two light wavelengths. The light guide arrangement is guided into the first opening at the first end into the measuring probe, and the optical device is arranged at the second opening at the second end of the measuring probe.

BRIEF DESCRIPTION OF THE DRAWINGS

The present invention is described in greater detail below on the basis of embodiments and of the drawings in which.

DETAILED DESCRIPTION

Figure 1:
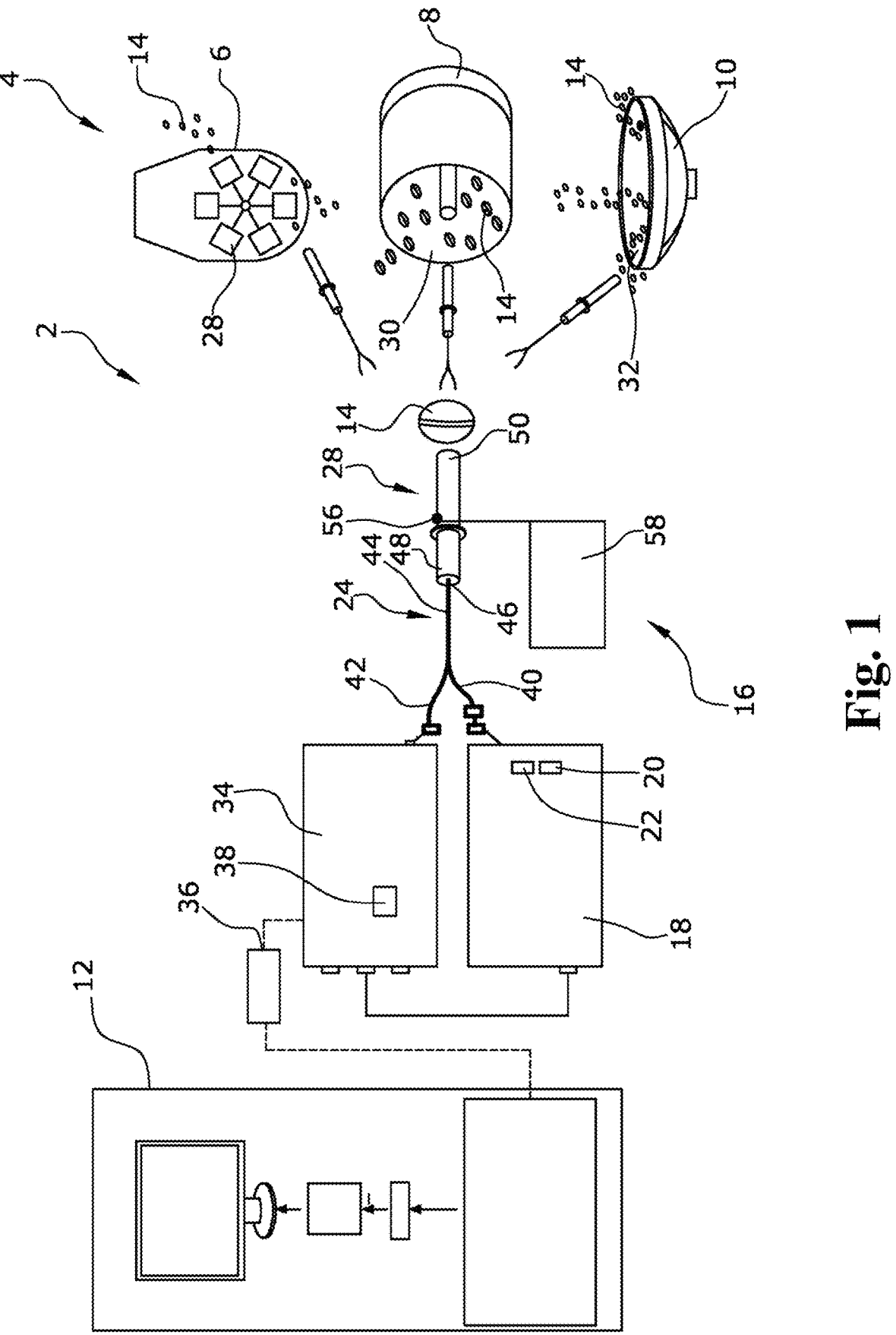
FIG. 1 shows a schematic illustration of different roasting arrangements with a color monitoring arrangement.

The present invention provides a measuring probe comprising a light guide arrangement which is guided into a first opening in a first end into the measuring probe, wherein the light guide arrangement comprises a light guide for applying the light emitted by the light sender and a second light guide for applying the reflected light to a light receiver, wherein an optical device is provided for applying a reflected light beam to a second end of the measuring probe. The measuring probe can here be configured in a simple manner as an elongated component, wherein the first end is opposite the second end. By integrating the light input of both the emitted light beam as well as the reflected light beam into the measuring probe, a particularly simple and compact color monitoring arrangement for determining a color value is made possible. Such a measuring probe is particularly suitable for reaching into a roasting container. It should here be noted that the term color value also includes comparative values of known color laboratory devices determined by mathematical models.

In an embodiment, the optical device for applying a reflected light beam is configured as a converging lens.

The light guide arrangement can advantageously be configured as a Y light guide, wherein the first light guide is connected to the light sender and the second light guide is connected to the light receiver, and a single light guide is guided through the first opening into the measuring probe.

A color monitoring arrangement which is particularly easy to manufacture and whose light sender does not require any special cooling is made possible by the fact that the light sensor comprises at least one LED or at least one laser as a light source. This makes it possible to very precisely generate the desired wavelengths of the light to be emitted in a simple manner.

The light wavelength $\lambda_1$=960-970 nm and the light wavelength $\lambda_2$=1550 nm have proven to be particularly advantageous light wavelength pairs.

The measuring probe comprises a flush air connection for connection to a flush air armature and an air guide arrangement in the area of the optical device in order to keep the second opening, and thus also the optical device provided in this area, free of water vapor or also of dirt particles. This makes it possible in a particularly simple manner to surround both the side of the optical device directed towards the inside and the side of the optical device directed into the roasting container with scavenging air, and consequently to keep the optical device in an ideal condition or to cool the optical device when the probe is installed directly in the roasting container.

In a particularly advantageous embodiment, the light sender can, for example, comprise light sources or a filter to generate light of different light wavelengths, wherein the light receiver comprises a light processing device to process light of different light wavelengths. It is here particularly advantageous if the light sources for generating light with different light wavelengths are differently designed LEDs or lasers. It is in this case particularly advantageous if the light sender is connected to the light receiver via control technology in order to transmit the respective emitted light wavelength to the light receiver and to thereby provide a reliable processing for quotient formation.

In a particularly advantageous embodiment, the measuring probe can, for example, comprise a removable cap with the second opening at the end directed towards the roasting container in order to be able to maintain and clean the measuring probe in a simple manner without having to remove the individual light guide.

The present invention also provides a roasting arrangement with a roaster comprising a roasting container defining a roasting space, wherein a roaster control unit of the roaster is connected via control technology to the evaluation unit of an aforementioned color monitoring arrangement, wherein the measuring probe is arranged on the roasting container so that the second end of the measuring probe extends into the roasting space.

It is particularly advantageous if the color value determined in the evaluation unit can be used as a control variable for the roasting control unit to determine the degree of roasting. The color value can in this case also comprise comparative values from known color laboratory devices, such as Colorette 4, Agtron®, etc., in order to be connected to existing roasting control units in a simple manner.

A temperature sensor is usually provided for the roasting chamber, wherein a maximum temperature value $T_{max}$ for stopping the roasting process is stored in the roaster control unit.

The present invention also provides a method for roasting a roasting product in a roasting container of such a roasting arrangement, wherein the roasting process is terminated as soon as the determined color value corresponds to a desired color value stored in the roasting control unit. It is advantageous if a maximum temperature value $T_{max}$ is additionally stored where, at the reaching of which, the roasting process is terminated.

In order to prevent the optical device of the measuring probe from being covered with water vapor at the end of the roasting process, it is advantageous if the flushing air is increased prior to the end of the roasting process. Increasing the pressure of the flushing air to up to 6 bar has already proven to be advantageous.

In particular for communication with existing roaster control units, it is advantageous if the color value is converted via mathematical models into comparative values of color laboratory devices, e.g. Colorette 4, Agtron®, etc.

The present invention is explained in greater detail below under reference to the drawings.

FIG. 1 shows a schematic representation of a roasting arrangement 2 according to the present invention. The roasting arrangement 2 essentially comprises a roaster 4, which in the present embodiment is represented by three roasting containers 6, 8, 10 to be used alternatively. This is to show schematically that the roasting arrangement 2 is not limited to one particular roaster 4. The roasting container 6 represents a paddle wheel roaster, the roasting container 8 a drum roaster, and the roasting container 10 a tray roaster. The roaster 4 is connected via control technology to a roaster control unit 12, which in particular controls the roasting process. The roasting product 14 can be any vegetable loose material, such as coffee beans, cocoa beans or cereals.

Figure 2:
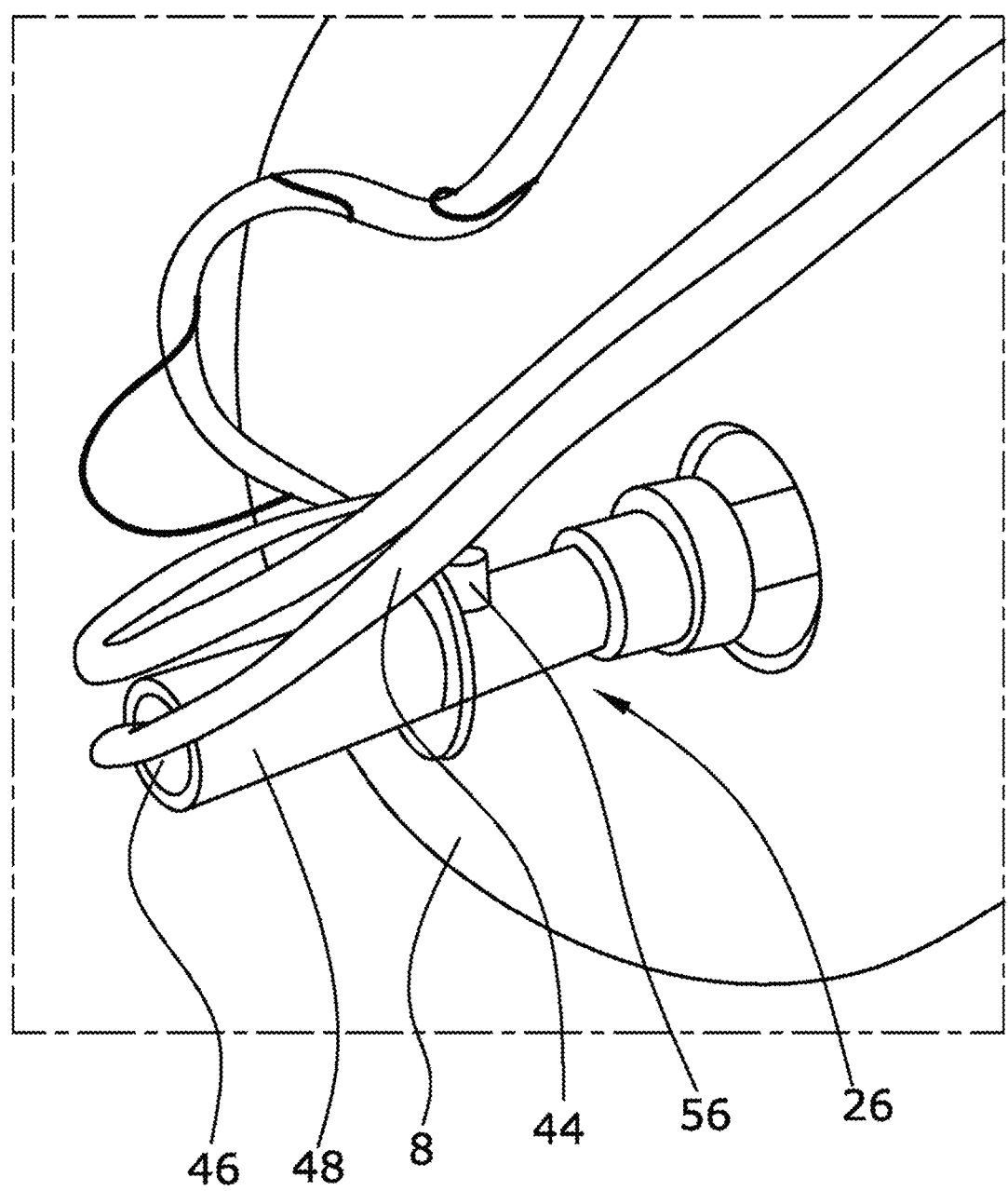
FIG. 2 shows a detailed view of a measuring probe arranged on a roasting container.

The roasting arrangement 2 also comprises a color monitoring arrangement 16 according to the present invention, which can also be retrofitted for the respective roasting container 6, 8, 10. The color monitoring arrangement 16 here has a light sender 18 with light sources 20, 22 which, in the present embodiment of the roasting arrangement 2, are designed differently as LEDs or lasers with regard to a light wavelength. The light sender 18 is connected to a measuring probe 26 via a light guide arrangement 24 so that the roasting product 14 in the respective roasting container 6, 8, 10 is irradiated with light of a light wavelength $\lambda_1$ of the light source 20 or with light of a light wavelength $\lambda_2$ of the light source 22. For this purpose, the measuring probe 26 (as shown in more detail in FIG. 2) is attached to the respective roasting container 6, 8, 10 and extends into the respective roasting chamber 28, 30, 32.

The color monitoring arrangement 16 also comprises a light receiver 34 and an evaluation unit 36. It is here pointed out that the present representation is merely schematic and, in particular, the light sender 18, the light receiver 34, and the evaluation unit 36 can also be arranged in a housing. The light receiver 34 is also operatively connected to the light guide arrangement 24 and receives the light of the light wavelengths $\lambda_1$ and $\lambda_2$ reflected by the roasting product 14 into the measuring probe 26. For this purpose, the light receiver 34 in particular comprises for a light processing unit 38 for processing the light of the different light wavelengths $\lambda_1$ and $\lambda_2$. To make this possible in a particularly simple manner, the light sender 18 is connected to the light receiver 34 via control technology.

The light guide arrangement 24 is here configured as a Y light guide, wherein a first light guide 40 is connected to the light sender 18 and a second light guide 42 is connected to the light receiver 34. Both the first light guide 40 and the second light guide 42 are connected in a known manner to a single light guide 44, which is guided through a first opening 46 into the elongated measuring probe 26. The first opening 46 is provided at a first end 48 of the measuring probe. At a second end 50 opposite the first end 48 (see FIG. 3), a converging lens 52 is provided at the end of the single light guide 44 as an optical device for applying the emitted light beam into the respective roasting chamber 28, 30, 32 and for applying the light beam reflected by the roasting product 14 via a second opening 54 into the single light guide 44. The converging lens 52 is in this case firmly connected to the single light guide 44, which is fixed in a defined manner in the measuring probe 26 via a mounting arrangement 55.

Figure 3:
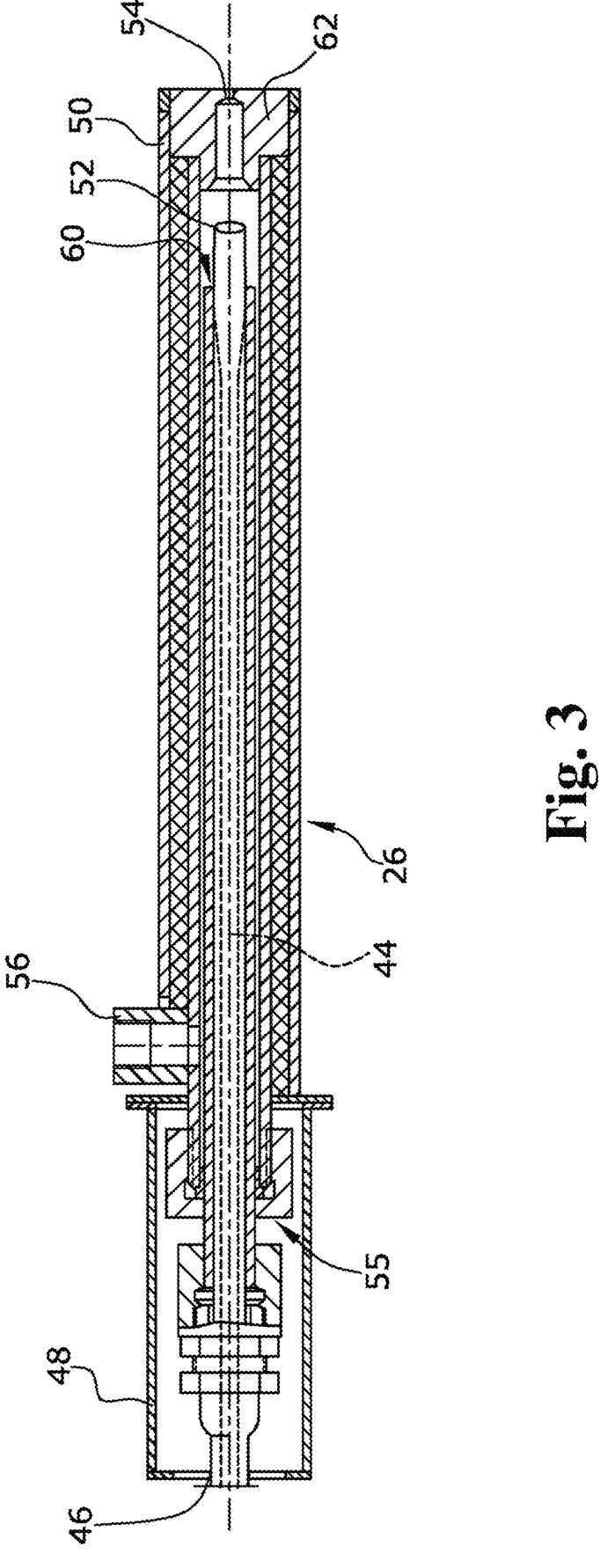
FIG. 3 shows a detailed view of the measuring probe of FIG. 2.

The measuring probe 26 also comprises a flush air connection 56 which is connected to a flush air armature 58. Flushing air is thereby fed under pressure into the measuring probe 26 in order to keep the side of the converging lens 52 facing the second opening 54 free of dirt and fogging. As shown in FIG. 3, the single light guide 44 with the converging lens 52 is provided in an air guide arrangement 60 so that when the flushing air leaves the measuring probe via the second opening 54, it flows around the converging lens 52 on the side facing the second opening 54, and also leaves the measuring probes 26 via this side. The air guide arrangement 60 in this case essentially consists of a channel surrounding the single light guide 44. At the same time, no roasting supply air or roasting exhaust air can enter the roasting container 6, 8, 10, whereby an appropriate cooling of the system is achieved by overpressure of the flushing air. The measuring probe 26 comprises a removable cap 62 with the second opening 54 at the second end 50 facing the roasting container 6, 8, 10 to provide easy maintenance and cleaning.

In a method for roasting a roasting product in a roasting arrangement 2 with one of the three roasting containers 6, 8, 10, the roasting process is monitored via a so-called color value which is stored in the roasting control unit 12 for the roasting product 14 in question. For this purpose, light with the light wavelengths $\lambda_1$ and $\lambda_2$ is alternately transmitted by the light sender via the light guide arrangement 24 and the converging lens 52 onto the roasting product to be roasted in the respective roasting chamber 28, 30, 32. The light reflected by the roasting product is in turn guided via the light guide arrangement to the light receiver 34 and transmitted to the evaluation unit 36 assigned by the signal coming from the light sender 18. A quotient formation of the respective reflection measurements, incident light to reflected light for the respective light wavelengths $\lambda_1$, $\lambda_2$, here takes place. The color value can then be determined from the quotient formation of the reflection measurements of the two light wavelengths $\lambda_1$, $\lambda_2$. The roasting process is terminated when the color value stored in the roaster control unit is reached.

A roasting end temperature $T_{max}$ is additionally stored in the roasting control unit 12, which is intended to prevent the roasting arrangement 2 from overheating in the event of incorrect measurements by the measuring probe 26. The roasting process is also terminated when this temperature $T_{max}$ is reached, i.e., this temperature limit value $T_{max}$ basically serves as a safety function to prevent over-roasting.

The present invention is not limited to embodiments described herein; reference should be had to the appended claims.

LIST OF REFERENCE NUMERALS

2 Roasting arrangement
4 Roaster
6 Roasting container (paddle wheel roaster)
8 Roasting container (drum roaster)
10 Roasting container (tray roaster)
12 Roasting control unit
14 Roasting product
16 Color monitoring arrangement
18 Light sender
20 Light source
22 Light source
24 Light guide arrangement

26 Measuring probe
28 Roasting chamber
30 Roasting chamber
32 Roasting chamber
34 Light receiver
36 Evaluation unit
38 Light processing unit
40 First light guide
42 Second light guide
44 Single light guide
46 First opening
48 First end
50 Second end (opposite of first end 48)
52 Converging lens
54 Second opening
55 Mounting arrangement
56 Flush air connection
58 Flush air armature
60 Air guide arrangement
62 Removable cap

What is claimed is:

1. A color monitoring arrangement for a roasting product, the color monitoring arrangement comprising:
  a light sender comprising at least one light source, the light sender being configured to emit a light beam provided by one of the at least one light source to illuminate the roasting product;
  a light receiver;
  a light guide arrangement comprising a first light guide which is configured to forward the light beam, and a second light guide which is configured to forward a reflected light reflected by the roasting product to the light receiver;
  an optical device which is configured to apply the light beam to the roasting product and to apply the reflected light into the light guide arrangement;
  an evaluation unit which is controllably connected to the light guide arrangement for defining at least one color value for the roasting product, the at least one color value being determined by determining a quotient of respective reflection measurements of a light intensity of the light beam to a light intensity of the reflected light, for each of at least two light wavelengths; and
  a measuring probe comprising a first opening at a first end, a second opening at a second end, and a flush air connection which is configured to connect to a flush air armature, wherein,
    the first end is opposite to the second end, and
    the flush air connection is arranged between the first opening and the second opening on a radial outer portion of the measuring probe,
  wherein,
  the light guide arrangement is guided into the first opening at the first end into the measuring probe, and
  the optical device is arranged at the second opening at the second end of the measuring probe.

2. The color monitoring arrangement as recited in claim 1, wherein the optical device is a converging lens.

3. The color monitoring arrangement as recited in claim 1, wherein,
  the light guide arrangement is configured as a Y light guide which further comprises a single light guide,
  the first light guide is connected to the light sender,
  the second light guide is connected to the light receiver, and
  the single light guide is guided through the first opening into the measuring probe.

4. The color monitoring arrangement as recited in claim 1, wherein the light sender comprises at least one LED or at least one laser as the at least one light source.

5. The color monitoring arrangement as recited in claim 1, wherein, a first light wavelength of the at least two light wavelengths is 960-970 nm, and a second light wavelength of the at least two light wavelengths is 1550 nm.

6. The color monitoring arrangement as recited in claim 1, wherein the measuring probe further comprises an air guide arrangement in the region of the optical device.

7. The color monitoring arrangement as recited in claim 1, wherein, the at least two light wavelengths emitted by the light sender is generated by the at least one light source or by the at least one light source together with a filter, and the light receiver comprises a light processing device which is configured to process light having the at least two wavelengths.

8. The color monitoring arrangement as recited in claim 7, wherein, the at least one light source comprises two light sources, the two light sources are provides as an LED or as a laser which are configured differently, and the two light sources each generate a light beam having a different light wavelength.

9. The color monitoring arrangement as recited in claim 8, wherein the light sender is controllably connected to the light receiver so as to transmit each light beam having the different light wavelength.

10. The color monitoring arrangement as recited in claim 1, wherein, the measuring probe further comprises a removable cap, and the second opening at the second end is directed towards a roasting container.

11. A roasting arrangement comprising:

a roaster comprising, a roasting container which defines a roasting chamber;

a roasting control unit; and the color monitoring arrangement as recited in claim 1, wherein, the roaster control unit is controllably connected to the evaluation unit of the color monitoring arrangement, and the measuring probe of the color monitoring arrangement is arranged on the roasting container so that the second end of the measuring probe extends into the roasting chamber.

12. The roasting arrangement as recited in claim 11, wherein the at least one color value determined by the evaluation unit is used as a control variable for the roasting control unit to determine a degree of roasting.

13. The roasting arrangement as recited in claim 11, further comprising:

a temperature sensor for the roasting chamber, wherein, a maximum temperature value is stored in the roasting control unit for interrupting a roasting process.

14. A method for roasting a roasting product in the roasting container of the roasting arrangement as recited in claim 11, wherein the roasting control unit has a desired color value stored therein, the method comprising:

commencing a roasting process; and terminating the roasting process when the at least one color value corresponds to the desired color value.

15. The method as recited in claim 14, wherein, the roasting arrangement further comprises a temperature sensor for the roasting chamber, and a maximum temperature value is stored in the roasting control unit for interrupting the roasting process, the method further comprising:

terminating the roasting process when the maximum temperature value is reached.

16. The method as recited in claim 14, further comprising:

increasing a flushing air supply at an end of the roasting process.

17. The method as recited in claim 14, further comprising:

converting the at least one color value into a comparative value of a color laboratory device via a mathematical model.

18. The method as recited in claim 17, wherein the color laboratory device is a Colorette 4 or an Agtron®.

* * * * *